No. 875,766. PATENTED JAN. 7, 1908.
F. R. ALLEN.
VEHICLE ATTACHMENT.
APPLICATION FILED MAY 15, 1907.
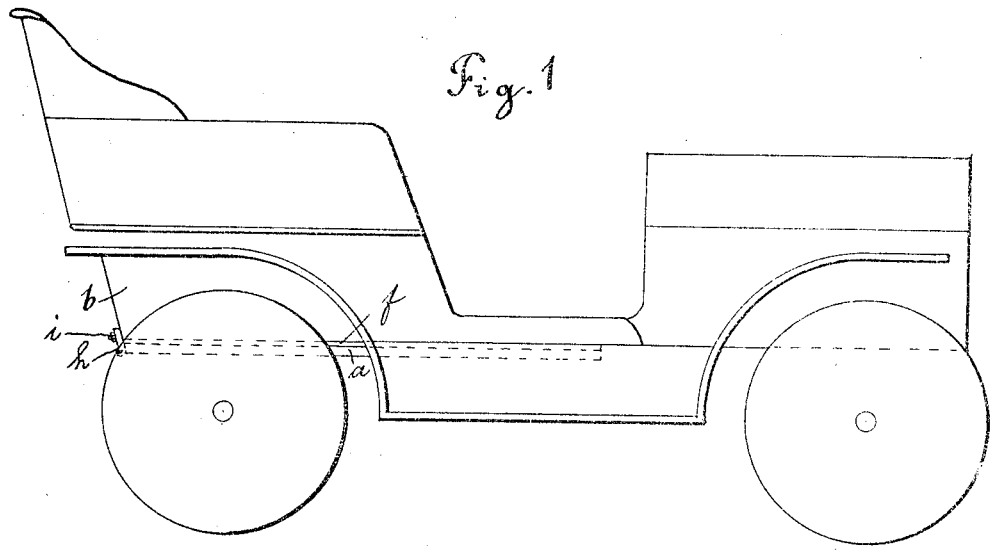
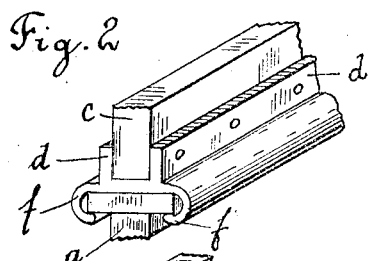
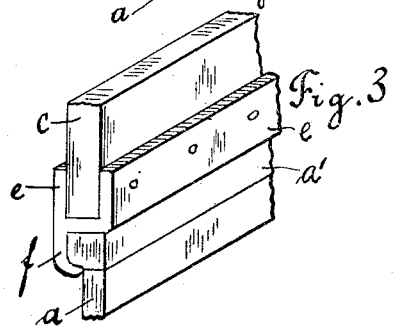
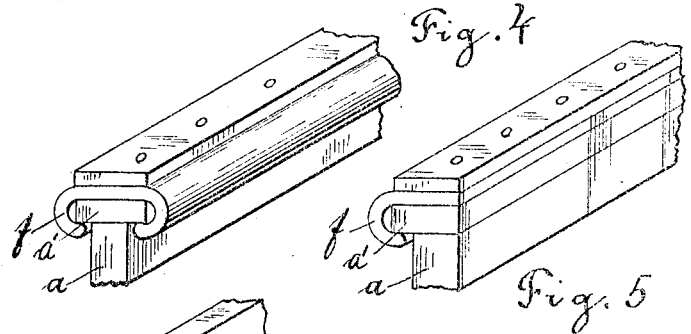
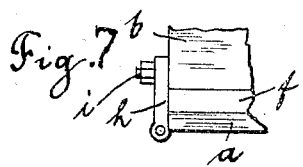
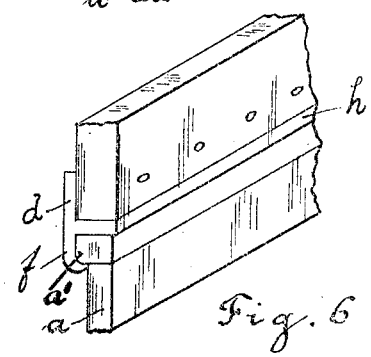
WITNESSES
Adolph Dissin
Justin A. Galland
INVENTOR
Frank R. Allen
BY
Andrew Field Jr.
ATTORNEY

UNITED STATES PATENT OFFICE.

FRANK R. ALLEN, OF PASSAIC, NEW JERSEY.

VEHICLE ATTACHMENT.

No. 875,766.　　　Specification of Letters Patent.　　　Patented Jan. 7, 1908.

Application filed May 15, 1907. Serial No. 373,736.

*To all whom it may concern:*

Be it known that I, FRANK R. ALLEN, a citizen of the United States, residing at the city of Passaic, in the county of Passaic and State of New Jersey, have invented certain new and useful Improvements in Vehicle Attachments, of which the following is a specification.

My invention relates to improvements in vehicle attachments.

In the usual form of automobile vehicles, great difficulty is experienced in examining and repairing the machinery beneath the body, and the object of my invention is to provide means for facilitating the removal of the vehicle body, to disclose the engine or machinery, and when desired for the substitution of one body for another.

While I have shown my device applied to an automobile vehicle, it may be used with any desired form of vehicle, and with my device one set of running gear may be easily and quickly applied to different bodies.

My device is illustrated in the accompanying drawings, in which

Figure 1 is a view of my device applied to a vehicle. Fig. 2 is a view of my device removed from the vehicle, and Figs. 3, 4, 5, and 6 are optional forms of the device. Fig. 7 is a view of the locking device.

Similar letters refer to similar parts throughout the several views.

On the top on each side of the running gear or chassis of a vehicle, are longitudinal strips $a\ a$ upon each of which may be secured a strip or track $a'$. On the bottom of the vehicle body are longitudinal strips $c$, secured at each side and each lying along the strip $a$ on the chassis, when the body is in position. On each of the longitudinal strips $c$ secured to the under side of the body $b$ at each side I provide a track engaging member. This track engaging member I prefer to form with two upwardly extending leaves $d\ d$ to be secured to the strip on the under side of the body, and having two downwardly extending leaves $f\ f$ engaging each side of the track $a'$, as shown in Fig. 2, as in this form of my device greater rigidity is obtained. I find, however, that the forms of track engaging device shown in Figs. 3, 4, 5, 6 and 7 may also be used to advantage, the form of my device being varied to conform to the construction of the vehicle to which it is applied.

In Fig. 3, I have shown two upwardly extending leaves $e\ e$, to engage the strip $c$ on the under side of the body $b$, and having one downwardly extending edge section or leaf $f$ to engage the track $a'$.

In Fig. 4, I have shown my device with the upwardly extending leaves omitted, and having two downwardly extending edge sections to over-lap the track $a'$. This form of my device may be used advantageously where the construction of the body is such, that the track engaging member may be attached to the body by screws or bolts passed through the track engaging member into the vehicle body. Where the structure of the vehicle is such that the downwardly extending leaves cannot conveniently over-lap both edges of the track, I omit one of the downwardly extending leaves, as shown in Fig. 5.

In Fig. 6 I have shown my device with one upwardly extending leaf $d$, and an inwardly extending central section $h$ to be secured to the vehicle body by means of screws or bolts, and one downwardly extending edge section $f$ to over-lap the track member $a'$.

It will thus be apparent that by means of my device, the body member may be moved upon the running gear to allow access to the engine or machinery on the running gear beneath the body, or the body member may be removed from the running gear, and another body substituted without difficulty. I also provide a locking means between the body and running gear, so that the body may not be accidentally displaced. This locking means I prefer to form of a bar $h$ hinged to the running gear $a$, and normally fitting upon the screw bolt $i$ in the body member $b$, and a screw nut upon the bolt $i$ to hold the same against accidental displacement.

Having thus described my invention, what I claim is,

1. In combination with a vehicle body, and the running gear thereof, strips secured to the under side of said body, tracks secured to the running gear and being disposed in vertical alinement with said strips, and guiding members each having a horizontal portion between said strips and tracks and a downwardly and inwardly extending part engaging the top, side, and bottom faces of said tracks 2. In combination with a vehicle body, and the running gear thereof, strips secured to said running gear, tracks secured to the top face of said strips and having one side projecting beyond the adjacent side of said strips, strips secured to the under face of the vehicle body and being disposed in vertical alinement with said strips of the running gear and guiding members each rigidly secured to said strips of the body and having a portion engaging said side of the track.

3. In combination with the vehicle body and running gear thereof, strips secured to said body and running gear thereof in vertical alinement with one another, tracks carried by said strips of the running gear, and guiding members each having a horizontal part lying between said strips of the body and tracks, a pair of upwardly extending parts to embrace and be secured to the side faces of the strips of the body, and downwardly and inwardly extending parts to engage said tracks.

4. In combination with a vehicle body, and the running gear thereof, strips secured to the under side of said body, and to the running gear, tracks secured to the strips of the running gear and having one of the sides thereof projecting beyond the adjacent side face of said strips of the running gear, and one piece guiding members each having a horizontal portion between said strips of the body and tracks, and having a vertical side member which extends downwardly and inwardly and which incloses said projecting portion of the tracks.

In testimony whereof, I, FRANK R. ALLEN, have signed my name to this specification in the presence of two subscribing witnesses, this thirteenth day of May, 1907.

FRANK R. ALLEN.

Witnesses:
 LEWIS A. ALLEN,
 M. D. COLLARD.